R. L. FRINK.
METHOD OF AND APPARATUS FOR DRAWING GLASS.
APPLICATION FILED MAR. 24, 1909.
1,119,007.
Patented Dec. 1, 1914.
2 SHEETS—SHEET 1.
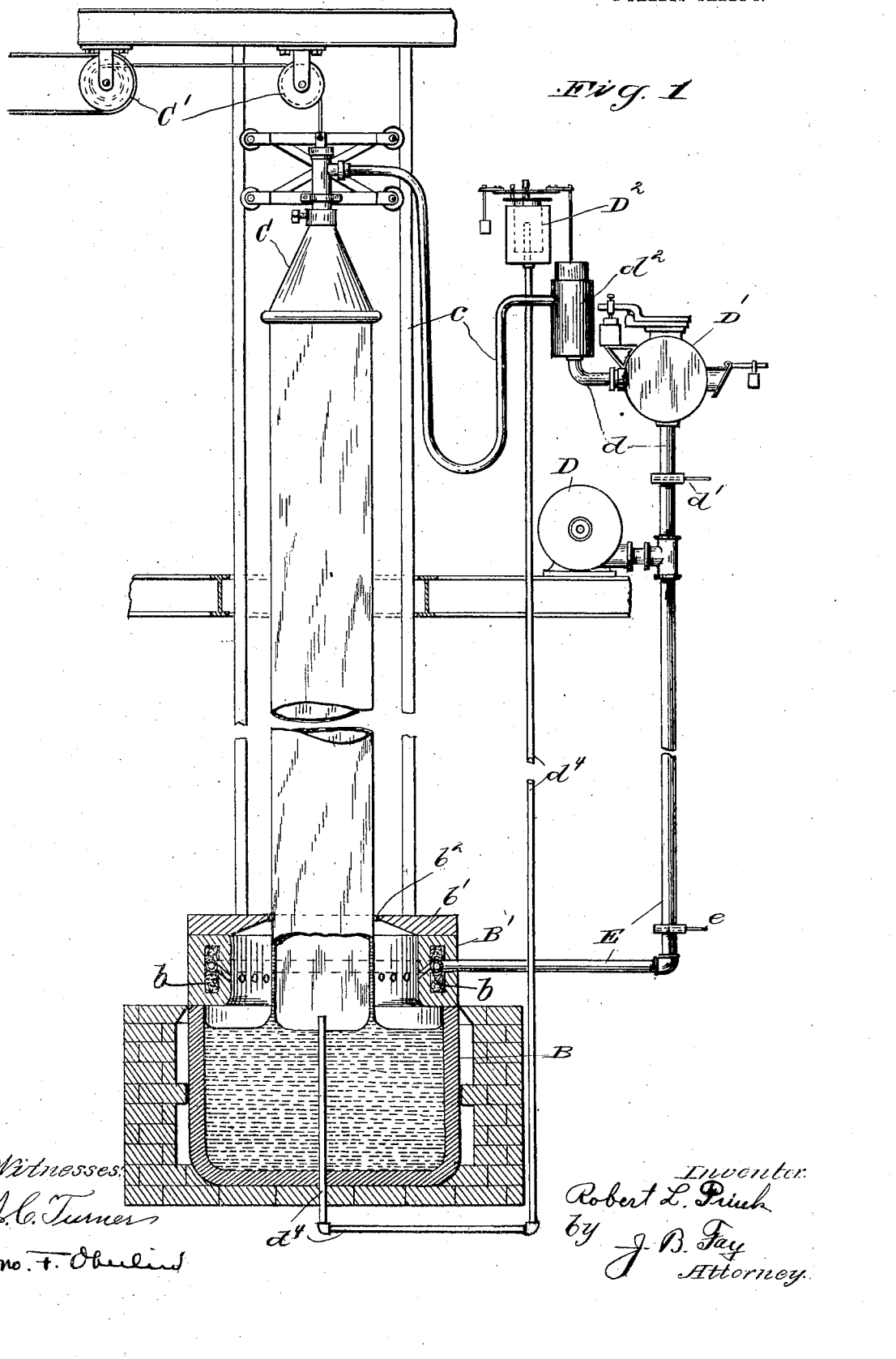

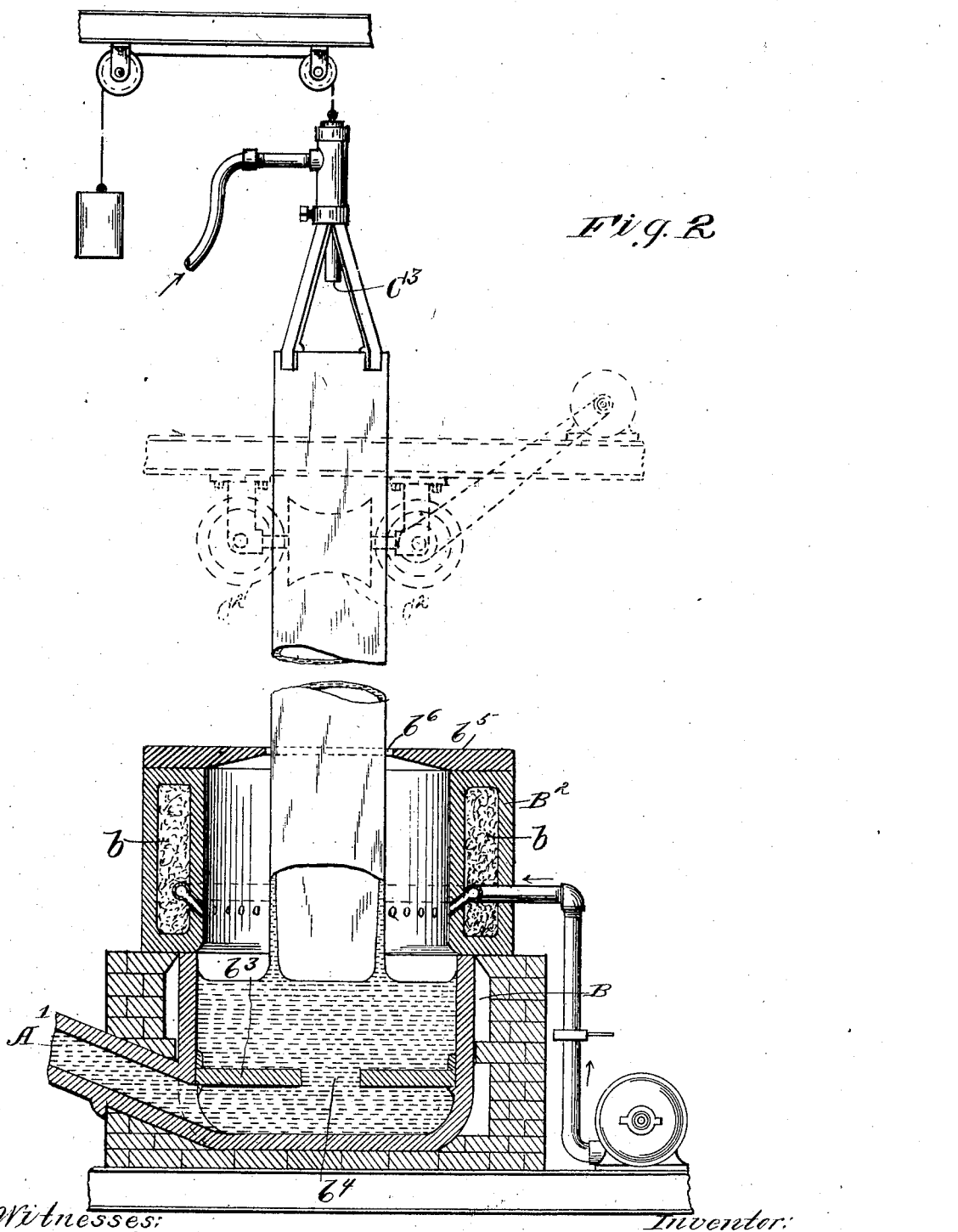

UNITED STATES PATENT OFFICE.

ROBERT L. FRINK, OF CLEVELAND, OHIO.

METHOD OF AND APPARATUS FOR DRAWING GLASS.

1,119,007.   Specification of Letters Patent.   Patented Dec. 1, 1914.

Application filed March 24, 1909. Serial No. 485,403.

*To all whom it may concern:*

Be it known that I, ROBERT L. FRINK, a citzen of the United States, and a resident of Cleveland, county of Cuyahoga, and State of Ohio, have invented a new and useful Improvement in Methods of and Apparatus for Drawing Glass, of which the following is a specification, the principle of the invention being herein explained and the best mode in which I have contemplated applying that principle, so as to distinguish it from other inventions.

In my Patent No. 846,102, granted March 5, 1907 I set forth a method of continually drawing glass cylinders or similar hollow glass articles, which consists, briefly stated, in introducing a pressure fluid such as air into a confined space within the article, and causing the article itself, under the action of the fluid, to regulate the escape of the fluid from such space. In the illustrative structure there shown the confined space in question is formed by means of a drawing-head that rises some distance above the level of the metal in the drawing pot or receptacle, and is of a size substantially to close the hollow article, the air being introduced into the portion of the latter between such head and the level of the metal.

The present invention has as its object, the provision of a diverse form of apparatus for attaining a result analogous to that obtained by the mechanism just described, namely that of regulating the pressure of air, or other fluid utilized to determine the form of the article being drawn, by the action of such air or fluid on the walls of the article. Along with this result, other advantages of practical significance are obtained by such invention, which to this end consists of the means and steps hereinafter fully described and particularly pointed out in the claims.

The annexed drawings and the following description set forth in detail certain means and modes for carrying out the invention; such disclosed means and modes constituting, however, but several of the various mechanical forms in which the principle of the invention may be used.

In said annexed drawings:—Figure 1 is a partial side elevation and partial section of a discontinuous cylinder drawing plant, wherein have been incorporated the several improvements constituting the present invention; and Fig. 2 represents in a similar fashion a modification of such invention applied to a continuous cylinder drawing plant.

The structure illustrated in Fig. 1 will be noted first, and at greater length than will be necessary in discussing the modified type shown in Fig. 2.

The cylinder is designed to be drawn from a drawing pot or receptacle B, to which the molten glass is designed to be supplied from an adjacent glass melting furnace by means of a ladle or the like (not shown). The particular manner, however, in which the metal is thus supplied to the pot, as also the details of construction of the latter, form no part of the present invention and, hence, need not be further noted in this connection. The drawing means proper that coöperate with the metal in the pot to draw a cylinder therefrom, comprise in the case of such intermittent drawing mechanism, a closed bait C that may be raised and lowered with respect to said pot by means of suitable operating mechanism C'. Such bait cap is connected by means of a hose $c$ or other flexible connection with air supply means, comprising a blower D and a supply pipe $d$ leading therefrom, suitable valves $d'$ $d^2$ and a regulating device D' being interposed in the latter. Of the valves in question, the one $d^2$ is designed to be automatically operated by suitable manometric means $D^2$ connected by a tube $d^4$ with the cylinder interior and adapted, by opening valve $d^2$ to a greater or less degree, to maintain a constant pressure within the rising cylinder. Such manometric means, it should be explained are set up and claimed in a separate application, filed Nov. 27, 1908, Serial No. 464,654 and are here typical of any suitable pressure regulating means, mechanical, manual, or otherwise. Mounted upon the walls that incase and support the drawing receptacle or pot, B, is an extension B' preferably cylindrical in form that rises to a height equal to or slightly above the normal point of set of the glass in the cylinder, when exposed to the normal effects of radiation in the open air. Such cylindrical extension is symmetrically disposed with respect to the axis of the rising cylinder, and is preferably built hollow, so as to include suitable insulating material $b$ that will render radiation from the cylinder equable and uniform in all directions. The inclosing chamber thus provided is capped with an annular cover $b'$, of relatively unyielding material that may be constructed in sections if desired, the aperture $b^2$ therein being designed to define the size of the cylinder. Connected with said chamber in the fashion shown, is an air supply pipe E that may be conveniently connected with the same blower D as is the supply pipe $D'$ through which air is furnished to the interior of the cylinder. A suitable valve $e$ in such supply pipe determines the amount of air that will be supplied to, and hence in a general way the pressure that will be maintained in, the chamber in question.

The operation of the apparatus thus far described, which will exemplify in general the method involved, contemplates the maintenance in the annular chamber surrounding the lower cylinder portion, and in the cylinder itself, of pressures that will be graduated to maintain the cylinder of substantially the desired diameter. In practice the pressure within the cylinder will conveniently be held constant by means of the apparatus shown, and then the pressure in the chamber surrounding the cylinder will be automatically regulated by the effect of any changes in such pressure upon the plastic cylinder walls. In other words, if such pressure should increase unduly, having regard to the pressure within the cylinder, the excess is automatically dissipated by a slight contraction of the cylinder where it passes through the apertured cap, permitting the escape of air from such chamber. This is possible because the glass composing the cylinder walls does not reach its point of set until after it emerges from the chamber. On the contrary, should the pressure within the cylinder increase unduly this aperture will be substantially closed, permitting the pressure exteriorly of the cylinder to accumulate, and thus restore the normal condition. The entire operation of the apparatus, so far as the maintenance of the required pressure within and without the cylinder is concerned, will hence be seen to be entirely automatic. It will further be observed, that whereas under the pressure conditions obtaining, where the cylinder is drawn in accordance with prevailing methods, the regulation of the pressures is a very delicate matter, owing to the fact that one of such pressures is atmospheric and that the other differs therefrom very slightly, by my present method and apparatus, I am enabled to employ considerably increased pressures, both within and without the cylinder, so that the regulation of such pressures becomes correspondingly easy.

In the modified form of apparatus illustrated in Fig. 2, I utilize, as has already been indicated, a form of continuous drawing mechanism in place of the discontinuous or intermittent mechanism just described. The construction and arrangement of the drawing pot B differs from that described before only in the provision of means, as a duct $A'$, whereby the molten glass may be supplied continuously to such pot during the drawing operation, and of other means as a transverse partition $b^3$ that has an aperture $b^4$ so disposed as to properly divert heated metal with respect to the base of the cylinder being drawn, all as fully set forth and claimed in my co-pending application filed June 22, 1908, Serial No. 437,967. In place, then, of the closed bait C capping the upper end of the cylinder, the latter is open, and the drawing is accomplished by means of a set of rolls $C^2$ shown as being four in number in the case in hand, and located directly above such drawing pot. The cylinder or "roller" being drawn is pressed between these rolls, and continuously drawn upwardly by them, once it has been started. For securing and maintaining the desired interior pressure, I employ a nozzle $C^3$ removably supported upon the upper, open end of the cylinder and adapted to direct a jet of air downwardly onto or into such open end, as occasion may demand. For the lower portion of the cylinder thus being drawn, I employ an inclosure $B^2$, that differs in construction from the one previously described only in being longer and heavier, so that the setting of the glass in the cylinder does not occur as rapidly as in the case of the other form of apparatus. In other words, this setting is appreciably retarded by eliminating in large part the cooling effect of free radiation from such lower cylinder portion. As a result, a much superior product is produced, since the molecules are given a correspondingly increased length of time in which to re-arrange themselves, and the strains that are caused in the glass by the sudden inhibition of such re-arrangement, where the glass is too quickly cooled, are avoided. In connection with inclosure $B^2$ I employ a cap or cover $b^5$ having an aperture $b^6$, that coöperates with the still plastic cylinder wall in all respects the same as in the first described form of my invention, variations in the relation of the internal to the external pressure being compensated in much the same fashion as before by the latter pressing in the walls of the cylinder about the edge of the aperture $b^6$.

Other modes of applying the principle of my invention may be employed instead of the one explained, change being made as regards the means and the steps herein disclosed, provided those stated by any one of the following claims or their equivalents be employed.

I therefore particularly point out and distinctly claim as my invention:—

1. The method of producing hollow glass articles, which consists in drawing a cylinder from a bath of molten glass, maintaining an approximately uniform pressure on the inside of the cylinder, and regulating the pressure on the outside of the cylinder to properly distend the plastic portion thereof, such regulation being secured by the effect of variations in such pressure upon the walls of such plastic cylinder portion, substantially as described.

2. The method of producing hollow glass articles, which consists in drawing a cylinder from a bath of molten glass, and regulating the pressure within a partially-confined space surrounding the plastic portion of said cylinder to properly distend such portion, such regulation being secured by the effect of variations in such pressure upon the walls of such plastic cylinder portion, substantially as described.

3. The method of producing hollow glass articles, which consists in drawing a cylinder from a bath of molten glass, maintaining an approximately uniform pressure, greater than atmospheric, on the inside of the cylinder, introducing air or other gaseous fluid into a partially-confined space surrounding the plastic portion of said cylinder, and controlling the escape of the fluid from such space by its action on the walls of the cylinder, substantially as described.

4. The method of producing hollow glass articles, which consists in drawing a cylinder from a bath of molten glass, supplying air or other gaseous fluid to the interior of the cylinder, regulating such supply by the pressure thus produced within the cylinder, simultaneously introducing like fluid into a partially-confined space surrounding the plastic portion of the cylinder, and controlling the escape of the fluid from such space by its action on the walls of the cylinder, substantially as described.

5. The method of producing hollow glass articles, which consists in drawing a cylinder from a bath of molten glass, supplying air to the interior of the cylinder, and maintaining a pressure other than atmospheric within the cylinder throughout the length of the latter, and without the cylinder at and adjacent its lower end.

6. The method of producing hollow glass articles, which consists in drawing a cylinder from a bath of molten glass, supplying air to the interior of the cylinder, and maintaining a pressure greater than atmospheric within the cylinder throughout its length, and without the cylinder at and adjacent the lower end of the latter.

7. The method of drawing glass articles which consists in supplying a pressure to the inside of the article, and externally insulating the lower plastic portion of the article to a point above that at which the glass normally sets when exposed to atmospheric pressure, and regulating the pressure within and without at the lower end of the article to properly distend the plastic portion thereof.

8. In apparatus for drawing glass, a drawing pot or receptacle, mechanism for drawing an article from the molten glass within said pot, a heat insulating chamber surrounding the lower plastic portion of the article to a point above that at which the glass normally sets, whereby the setting of the glass is retarded, and means for supplying pressure fluid to the interior of the article and to said heat insulating chamber.

9. In apparatus for drawing glass, a drawing pot or receptacle; mechanism coöperative with said receptacle to draw a cylinder from molten glass therein; a chamber inclosing the lower portion of such cylinder, said chamber having an apertured cover through which such cylinder passes, and said cover being located in such proximity to the bath that the glass will still be plastic when it passes therethrough; and means for supplying pressure-fluid to the interior of such cylinder and to said chamber, respectively.

10. In apparatus for drawing glass, a drawing pot or receptacle; mechanism coöperative with said receptacle to draw a cylinder from molten glass therein; a chamber inclosing the lower portion of such cylinder, said chamber having an apertured cover through which such cylinder passes, and said cover being located in such proximity to the bath that the glass will still be plastic when it passes therethrough; means for supplying pressure-fluid to the interior of such cylinder and to said chamber, respectively; and means controlling said first-named supply-means to maintain a substantially uniform pressure in such cylinder interior.

11. In apparatus for drawing glass, a drawing pot or receptacle; mechanism coöperative with said receptacle to draw a cylinder from molten glass therein; a chamber inclosing the lower portion of such cylinder, said chamber having an apertured cover through which such cylinder passes, and said cover being located in such proximity to the bath that the glass will still be plastic when it passes therethrough; means for supplying pressure-fluid to the interior of such cylinder and to said chamber, respectively; and means, operatively affected by variations in pressure in such cylinder interior, adapted to control said first-named supply-means.

12. In apparatus for drawing glass, a drawing pot or receptacle; mechanism coöperative with said receptacle to draw a cylinder from molten glass therein; a heat insulating chamber inclosing the lower portion of such cylinder to a point above that at which the glass normally sets, whereby such setting is correspondingly retarded; an apertured cover for said chamber, such cylinder passing through the aperture in said cover and the latter being so located that the glass will still be plastic when it passes therethrough; and fluid-pressure regulating means connected with said chamber and also with said cylinder.

Signed by me this 6th day of March, 1909.

ROBERT L. FRINK.

Attested by—
 ANNA L. GILL,
 JNO. F. OBERLIN.

Copies of this patent may be obtained for five cents each, by addressing the "Commissioner of Patents, Washington, D. C."